(12) United States Patent
Zimmer et al.

(10) Patent No.: US 8,583,908 B2
(45) Date of Patent: Nov. 12, 2013

(54) ENHANCED NETWORK AND LOCAL BOOT OF UNIFIED EXTENSIBLE FIRMWARE INTERFACE IMAGES

(75) Inventors: Vincent J. Zimmer, Federal Way, WA (US); Palsamy Sakthikumar, Puyallup, WA (US); Mallik Bulusu, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 1197 days.

(21) Appl. No.: 11/968,032

(22) Filed: Dec. 31, 2007

(65) Prior Publication Data
US 2009/0172381 A1    Jul. 2, 2009

(51) Int. Cl.
*G06F 15/177* (2006.01)
*G06F 7/04* (2006.01)

(52) U.S. Cl.
USPC ............. 713/2; 713/1; 726/2; 726/26; 726/27

(58) Field of Classification Search
USPC .................. 713/1, 2; 718/1; 726/2, 26, 27
See application file for complete search history.

(56) References Cited

U.S. PATENT DOCUMENTS

| 5,210,875 | A  | * | 5/1993  | Bealkowski et al. ............. 713/2 |
| 7,069,442 | B2 |   | 6/2006  | Sutton, II |
| 2003/0188113 | A1 | * | 10/2003 | Grawrock et al. ............ 711/156 |
| 2004/0103299 | A1 | * | 5/2004  | Zimmer et al. ............... 713/200 |
| 2005/0071619 | A1 | * | 3/2005  | Chu et al. ......................... 713/2 |
| 2008/0222663 | A1 | * | 9/2008  | Carpenter et al. ............ 719/328 |

OTHER PUBLICATIONS

Garris et al., Towards Trustworthy Kiosk Computing, Oct. 17, 2006, IBM Reasearch Report, pp. 1-7 + cover.*

* cited by examiner

*Primary Examiner* — Mark Connolly
(74) *Attorney, Agent, or Firm* — Blakely, Sokoloff, Taylor & Zafman LLP (57) ABSTRACT

Techniques and architectures to provide high assurance image invocation in a pre-boot environment. These techniques may augment implementations of the Unified Extensible Firmware Interface (UEFI) to invoke UEFI images using Trusted Execution Technology (TXT). This can operate to combine pre-boot secure flows, such as UEFI image invocation, with the secure launch instruction set extensions of TXT. This may entail combination of the UEFI StartImage instruction with the SMX leaf SENTER instruction. This may operate to allow original equipment manufacturer (OEM) firmware as a guard and that uses UEFI and TXT access control logic at the same instance to pass control to the operating system (OS).

20 Claims, 9 Drawing Sheets

ENHANCED NETWORK AND LOCAL BOOT OF UNIFIED EXTENSIBLE FIRMWARE INTERFACE IMAGES

TECHNICAL FIELD

Embodiments of the invention relate to secure computing environments. More particularly, embodiments of the invention relate to techniques for passing control of a computing device from firmware to a third-party application in a potentially secure manner.

BACKGROUND

The increasing number of financial and personal transactions being performed on local or remote computing platforms has given impetus for the establishment of "trusted" or "secured" computing environments. The problem these environments try to solve is that of loss of privacy, or data being corrupted or abused. Users do not want their private data made public. They also do not want their data altered or used in inappropriate transactions. Examples of these include unintentional release of medical records or electronic theft of funds from an on-line bank or other depository. Similarly, content providers seek to protect digital content (for example, music, other audio, video, or other types of data in general) from being copied without authorization.

One solution is a trusted system that may utilize a complete closed set of trusted software. This method is relatively simple to implement, but has the disadvantage of not allowing the simultaneous use of common, commercially available operating system and application software. This disadvantage limits the acceptance of such a trusted system. Therefore, additional and/or different mechanisms to support trusted computing environments are desirable.

All registered trademarks used herein are the property of the respective owners of said trademarks. Use of the trademarks herein may provide examples of components that may be used.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are techniques and architectures to provide high assurance image invocation in a pre-boot environment. In one embodiment, techniques described herein may augment implementations of the Unified Extensible Firmware Interface (UEFI) to invoke UEFI images using Intel's Trusted Execution Technology (TXT). Other similar security techniques and architectures may also be supported using the concepts described herein. This can operate to combine pre-boot secure flows, such as UEFI image invocation, with the secure launch instruction set extensions of TXT. In one embodiment, this entails combination of the UEFI StartImage instruction with the SMX leaf SENTER instruction. This may operate to allow original equipment manufacturer (OEM) firmware as a guard and that uses UEFI and TXT access control logic at the same instance to pass control to the operating system (OS).

Before providing the details of high assurance image invocation in a pre-boot environment, a summary of some of the components and instructions is provided. Currently, this process is staggered when TXT is used in a "late launch" fashion. The use of these SMX instructions enables a type of machine behavior known as a Dynamic Root of Trust for Measurement (DRTM), because at the invocation of these instructions, the ensuing executable is "measured" or has its image recorded into the platform configuration register (PCR) of a Trusted Platform Module (TPM).

In other embodiments, the techniques and architectures described are equally applicable to the TXT-equivalent of Advanced Micro Devices (AMD) of Sunnyvale, Calif., namely the Presidio® security extensions. UEFI firmware using SENTER instruction could equally employ for example AMD's SKINIT instruction.

Figure 1:
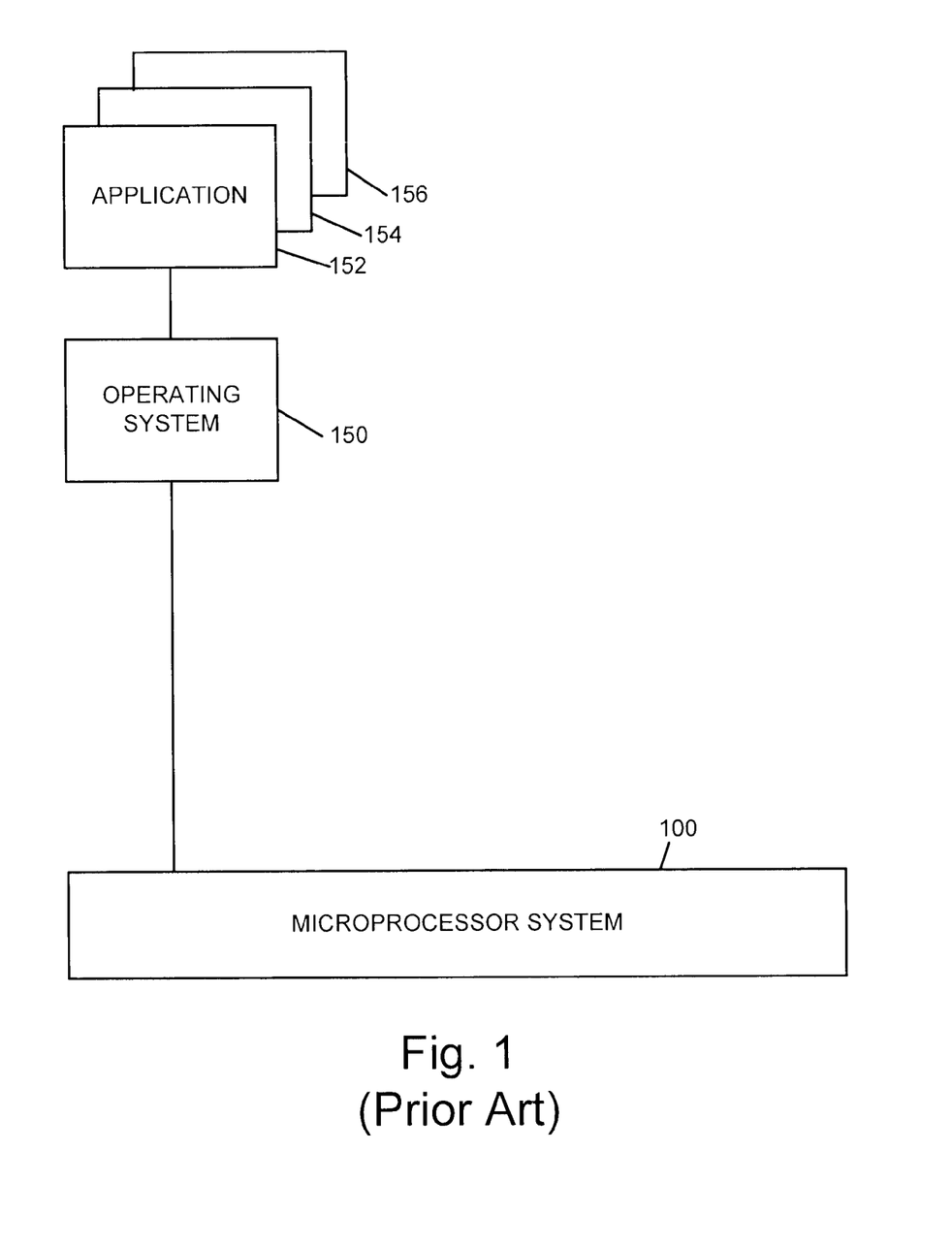
FIG. 1 is a block diagram of one embodiment of a software environment executing in a computing system.

FIG. 1 is a block diagram of one embodiment of a software environment executing in a computing system. The software shown in FIG. 1 is not trusted (untrusted). When operating in a high privilege level, the size and constant updating of operating system 150 make it very difficult to perform any trust analysis in a timely manner. Much of the operating system sits within privilege ring zero (0), the highest level of privilege.

Applications 152, 154, and 156 have much reduced privilege and typically reside within privilege ring three (3). The existence of the differing privilege rings and the separation of operating system 150 and applications 152, 154 and 156 into these differing privileged rings would appear to allow operating of the software of FIG. 1 in a trusted mode, based on making a decision to trust the facilities provided by operating system 150. However, in practice making such a trust decision is often impractical.

Factors that contribute to this problem include the size (number of lines of code) of operating system 150, the fact that operating system 150 may be the recipient of numerous updates (new code modules and patches) and the fact that the operating system 150 may also contain code modules such as device drivers supplied by parties other than the operating system developer. Operating system 150 may be a common one such as Microsoft® Windows®, Linux, or Solaris®, or may be any other appropriate known or otherwise available operating system. The particular types or names of applications or operating systems run or running are not critical.

Figure 2:
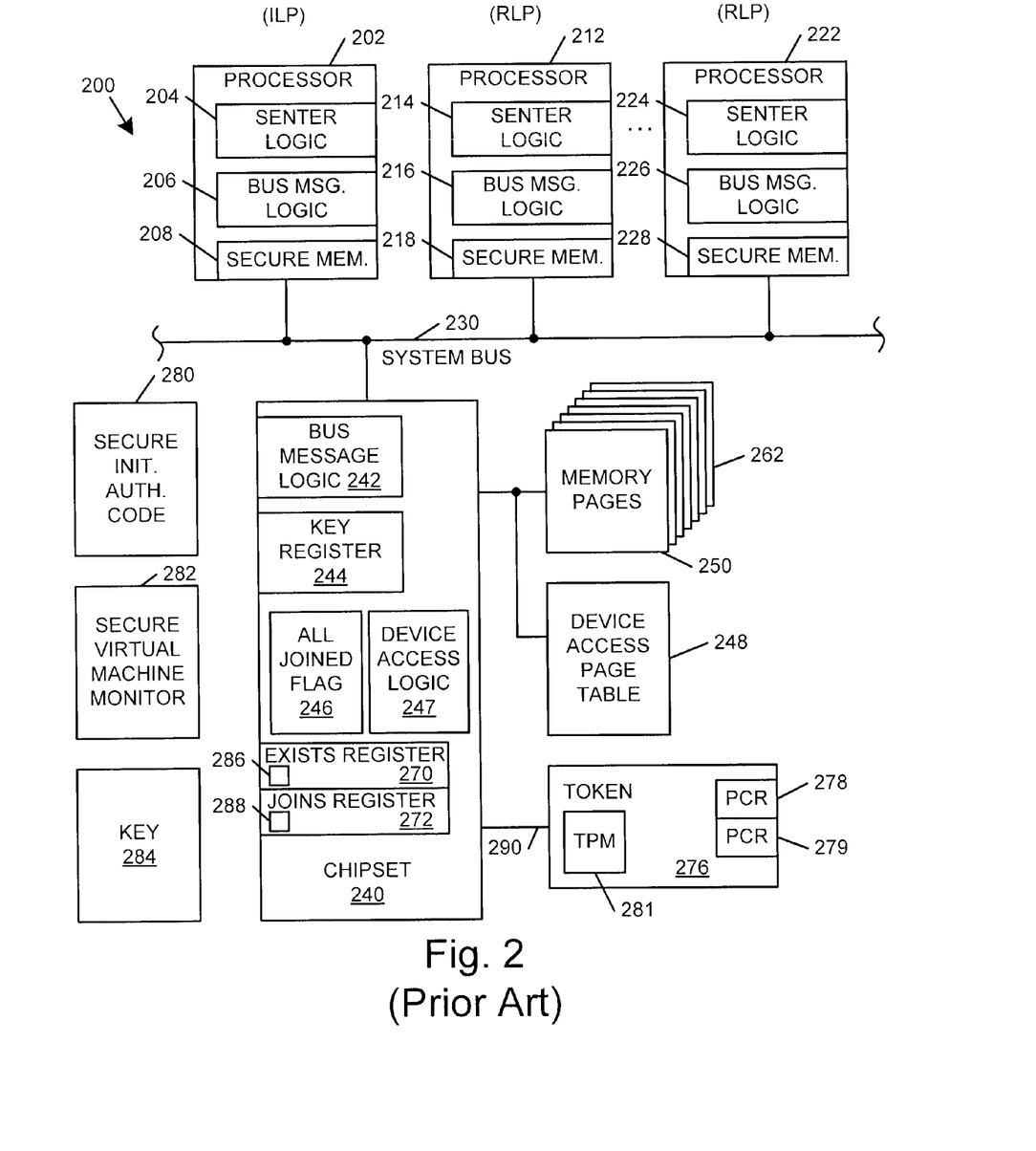
FIG. 2 is a block diagram of one embodiment of trusted or secured software modules and system environment.

FIG. 2 is a block diagram of one embodiment of trusted or secured software modules and system environment. In FIG. 2, processor 202, processor 212, processor 222, and optional other processors (not shown) are shown as separate hardware entities. In other embodiments, the number of processors may differ, as may the boundary of various components and functional units. In some embodiments the processors may be replaced by separate hardware execution threads or "logical processors" running on one or more physical processors.

Processors 202, 212, 222 may contain certain special circuits or logic elements to support secure or trusted operations. For example, processor 202 may contain secure enter (SENTER) logic 204 to support the execution of special SENTER instructions that may initiate trusted operations. Processor 202 may also contain bus message logic 206 to support special bus messages on system bus 230 in support of special SENTER operations.

In alternate embodiments, memory control functions of chipset 240 may be allocated to circuits within the processors, and for multiple processors may be included on a single die. In these embodiments, special bus messages may also be sent on busses internal to the processors. The use of special bus messages may increase the security or trustability of the system for several reasons.

Circuit elements such as processors 202, 212, and 222 or chipset 240 may only issue or respond to such messages if they contain the appropriate logic elements of embodiments of the present disclosure. Therefore successful exchange of the special bus messages may help ensure proper system configuration. Special bus messages may also permit activities that should normally be prohibited, such as resetting platform configuration register 278. The ability of potentially hostile untrusted code to spy on certain bus transactions may be curtailed by allowing special bus messages to be issued only in response to special security instructions.

Additionally, processor 202 may contain secure memory 208 to support secure initialization operations. In one embodiment secure memory 208 may be an internal cache of processor 202, perhaps operating in a special mode. In alternate embodiments secure memory 208 may be special memory. Other processors such as processor 212 and processor 222 may also include SENTER logic 214, 224, bus message logic 216, 226, and secure memory 218, 228.

A "chipset" may be defined as a group of circuits and logic that support memory and input/output (I/O) operations for a connected processor or processors. Individual elements of a chipset may be grouped together on a single chip, a pair of chips, or dispersed among multiple chips, including processors. In FIG. 2, chipset 240 may include circuitry and logic to support memory and I/O operations to support processors 202, 212, and 222.

In one embodiment, chipset 240 may interface with a number of memory pages 250 through 262 and device-access page table 248 containing control information indicating whether non-processor devices may access memory pages 250 through 262. Chipset 240 may include device-access logic 247 that may permit or deny direct memory access (DMA) from I/O devices to selected portions of memory pages 250 through 262.

In some embodiments, device access logic 247 may contain all relevant information required to permit or deny such accesses. In other embodiments, device access logic 247 may access such information held in device access page table 248. The actual number of memory pages is not important and will change depending upon system requirements. In other embodiments the memory access functions may be external to chipset 240. The functions of chipset 240 may further be allocated among one or more physical devices in alternate embodiments.

Chipset 240 may additionally include its own bus message logic 242 to support special bus messages on system bus 230 in support of special SENTER operations. Some of these special bus messages may include transferring the contents of key register 244 to processor 202, 212, or 222, or permitting a special ALL_JOINED flag 274 to be examined by processor 202, 212, or 222. Additional features of bus message logic 242 may be to register bus activity by processors in "EXISTS" register 272 and store certain special bus message activity by processors in "JOINS" register 272. Equality of contents of EXISTS register 272 and JOINS register 272 may be used to set ALL_JOINED flag 274 to indicate all processors in the system are participating in the secure enter process.

Chipset 240 may support standard I/O operations on I/O busses such as peripheral component interconnect (PCI), accelerated graphics port (AGP), universal serial bus (USB), low pin count (LPC) bus, or any other kind of I/O bus (not shown). Interface 290 may be used to connect chipset 240 with token 276, containing one or more platform configuration registers (PCR) 278, 279. In one embodiment, interface 290 may be the LPC bus (Low Pin Count (LPC) Interface Specification, Intel Corporation, rev. 1.0, 29 Dec. 1997) modified with the addition of certain security enhancements.

One example of such a security enhancement would be a locality confirming message, utilizing a previously-reserved message header and address information targeting platform configuration register (PCR) 278 within token 276. In one embodiment, token 276 may contain special security features, and in one embodiment may include the trusted platform module (TPM) 281 disclosed in the Trusted Computing Platform Alliance (TCPA) Main Specification, version 1.1a, 1 Dec. 2001, issued by the TCPA (available at the time of filing of the present application at "trustedpc.com").

Two software components identified in system environment 200 are Secure Virtual Machine Monitor (SVMM) 282 module and Secure Initialization Authenticated Code (SINIT-AC) 280 module. SVMM 282 module may be stored on a system disk or other mass storage, and moved or copied to other locations as necessary. In one embodiment, prior to beginning the secure launch process SVMM 282 may be moved or copied to one or more memory pages 250 through 262. Following the secure enter process, a virtual machine environment may be created in which the SVMM 282 may operate as the most privileged code within the system, and may be used to permit or deny direct access to certain system resources by the operating system or applications within the created virtual machines.

Some of the actions required by the secure enter process may be beyond the scope of simple hardware implementations, and may instead advantageously use a software module whose execution can be implicitly trusted. In one embodiment, these actions may be performed by Secure Initialization (SINIT) code. Three exemplary actions are identified here, but these actions should not be taken to be limiting.

One action may require that various controls representing critical portions of the system configuration be tested to ensure that the configuration supports the correct instantiation of the secure environment. In one embodiment, one required test may be that the memory controller configuration provided by chipset 240 does not permit two or more different system bus addresses to touch the same location within memory pages 250 through 262.

A second action may be to configure the device-access page table 248 and device-access logic 247 to protect those memory pages used by the memory-resident copy of SVMM 282 from interference by non-processor devices.

A third action may be to calculate and register the SVMM 282 module's identity and transfer system control to it. Here "register" means placing a trust measurement of SVMM 282 into a register, for example into PCR 278 or into PCR 279. When this last action is taken, the trustworthiness of the SVMM 282 may be inspected by a potential system user.

The SINIT code may be produced by the manufacturer of the processors or of the chipsets. For this reason, the SINIT code may be trusted to aid in the secure launch of chipset 240. In order to distribute the SINIT code, in one embodiment a well-known cryptographic hash is made of the entire SINIT code, producing a value known as a "digest". One embodiment produces a 160-bit value for the digest. The digest may then be encrypted by a private key, held in one embodiment by the manufacturer of the processor, to form a digital signature. When the SINIT code is bundled with the corresponding digital signature, the combination may be referred to as SINIT authenticated code (SINIT-AC) 280. Copies of the SINIT-AC 280 may be later validated as discussed below.

SINIT-AC 280 may be stored on system disk or other mass storage or in a fixed media, and moved or copied to other locations as necessary. In one embodiment, prior to beginning the secure launch process SINIT-AC 280 may be moved or copied into memory pages 250-262 to form a memory-resident copy of SINIT-AC.

Any logical processor may initiate the secure launch process, and may then be referred to as the initiating logical processor (ILP). In the present example processor 202 becomes the ILP, although any of the processors on system bus 230 could become the ILP. Neither memory-resident copy of SINIT-AC 280 nor memory-resident copy of SVMM 282 may be considered trustworthy at this time since, among other reasons, the other processors or the DMA devices may overwrite memory pages 250-262.

The ILP (processor 202) then executes a special instruction. This special instruction may be referred to as a secured enter (SENTER) instruction, and may be supported by SENTER logic 204. Execution of the SENTER instruction may cause the ILP (processor 202) to issue special bus messages on system bus 230, and then wait considerable time intervals for subsequent system actions.

After execution of SENTER begins, one of these special bus messages, SENTER BUS MESSAGE, is broadcast on system bus 230. Those logical processors other than the ILP, which may be referred to as responding logical processors (RLPs), respond to the SENTER BUS MESSAGE with an internal non-maskable event. In the present example, the RLPs include processor 212 and processor 222. The RLPs must each terminate current operations, send a RLP acknowledge (ACK) special bus message on system bus 230, and then enter a wait state. It should be noted that the ILP also sends its own ACK message over system bus 230.

The chipset 240 may contain a pair of registers, "EXISTS" register 270 and "JOINS" register 272. These registers may be used to verify that the ILP and all of the RLPs are responding properly to the SENTER BUS MESSAGE. In one embodiment, chipset 240 may keep track of all operational logical processors in the system by writing a "1" into the corresponding bit of the EXISTS register 270 on any system bus transaction made by that logical processor. In this embodiment, each transaction on system bus 230 must contain an identification field containing the logical processor identifier.

In one embodiment, this consists of a physical processor identifier and an identifier for the hardware execution thread within each physical processor. For example, if a thread executing on processor 222 caused any bus transactions on system bus 230, chipset 240 would see this logical processor identifier within the transaction and write a "1" into the corresponding location 286 within EXISTS register 270.

During the secure launch process, when that same thread on processor 222 sends its ACK message on system bus 230, the chipset 240 would also see this and could write a "1" into the corresponding location 288 in the JOINS register 272. (In the FIG. 2 example, each physical processor is shown with only a single thread executing for clarity. In alternate embodiments the physical processors may support multiple threads, and thereby multiple logical processors.) When the contents of the JOINS register 272 matches the contents of the EXISTS register 270, then chipset 240 can set an ALL_JOINED flag 246 indicating that all processors have properly responded to the SENTER BUS MESSAGE.

In another embodiment, EXISTS register 270 and JOINS register 272 may continue to aid security subsequent to the setting of the ALL_JOINED flag 246. During the time subsequent to the setting of the ALL_JOINED flag 246 until the end of trusted or secure operations, chipset 240 may continue to monitor and compare bus cycles against the JOINS register 272. During this period, if chipset 240 ever sees a bus transaction from a logical processor that is not currently identified in JOINS register 272, then chipset 240 may presume that this logical processor has somehow "appeared" late. This would imply that such a logical processor did not participate in the secure launch process, and therefore could represent an attacker (security threat). In such circumstances, chipset 240 may respond appropriately to keep this attacker out of the secured environment.

In one embodiment, chipset 240 may force a system reset in such circumstances. In a second embodiment, similar detection of a "late" processor may be achieved by each logical processor asserting a special reserved signal on the system bus on every transaction following the assertion of the ACK bus message. In this embodiment, following the setting of the ALL_JOINED flag 246 if the chipset 240 observes a bus transaction initiated by a processor without the special signal asserted, then chipset 240 may again presume that this logical processor has somehow appeared "late", and may represent an attacker.

After issuing the SENTER BUS MESSAGE, the ILP (processor 202) polls the ALL_JOINED flag 246 to see when and if all processors have properly responded with their ACKs. If the flag 246 is never set, several implementations are possible. A watchdog timer in the ILP or chipset or elsewhere may cause a system reset. Alternatively, the system may hang requiring operator reset. In either case the assertion of a secure environment is protected (in that the secure launch process does not complete unless all processors participate), although the system may not continue to function. In normal operations, after a short time the ALL_JOINED flag 246 is set, and the ILP may be assured that all other logical processors have entered a wait state.

When the ALL_JOINED flag 246 is set, the ILP (processor 202) may move both a copy of SINIT-AC 280 and key 284 into secure memory 208 for the purpose of authenticating and subsequently executing the SINIT code included in SINIT-AC 280. In one embodiment, this secure memory 208 may be an internal cache of the ILP (processor 202), perhaps operating in a special mode.

Key 284 represents the public key corresponding to the private key used to encrypt the digital signature included in the SINIT-AC 280 module, and is used to verify the digital signature and thereby authenticate the SINIT code. In one embodiment, key 284 may already be stored in the processor, perhaps as part of the SENTER logic 204. In another embodiment, key 284 may be stored in a read-only key register 244 of chipset 240, which is read by the ILP.

In yet another embodiment, either the processor or the chipset's key register 244 may actually hold a cryptographic digest of key 284, where key 284 itself is included in the SINIT-AC 280 module. In this last embodiment, the ILP reads the digest from key register 244, calculates an equivalent cryptographic hash over the key 284 embedded in SINIT-AC 280, and compares the two digests to ensure the supplied key 284 is indeed trusted.

A copy of SINIT-AC and a copy of a public key may then exist within secure memory 208. The ILP may now validate the copy of SINIT-AC by decrypting the digital signature included in the copy of the SINIT-AC using the copy of a public key. This decryption produces an original copy of a cryptographic hash's digest. If a newly-calculated digest matches this original digest then the copy of SINIT-AC and its included SINIT code may be considered trustable.

The ILP may now issue another special bus message, SENTER CONTINUE MESSAGE, via system bus 230 signaling the waiting RLP's (processor 212, processor 222) and chipset 240 that secured operations are going to be initiated. The ILP may now register the unique identity of the SINIT-AC module by writing the SINIT-AC module's cryptographic digest value to a platform configuration register 272 in the security token 276, as outlined below. The ILP's execution of its SENTER instruction may now terminate by transferring execution control to the trusted copy of the SINIT code held within the ILP's secure memory 208. The trusted SINIT code may then perform its system test and configuration actions and may register the memory-resident copy of SVMM, in accordance with the definition of "register" above.

Registration of the memory-resident copy of SVMM may be performed in several manners. In one embodiment, the SENTER instruction running on the ILP writes the calculated digest of SINIT-AC into PCR 278 within the security token 276. Subsequently, the trusted SINIT code may write the calculated digest of the memory-resident SVMM to the same PCR 278 or another PCR 279 within the security token 276. If the SVMM digest is written to the same PCR 278, the security token 276 hashes the original contents (SINIT digest) with the new value (SVMM digest) and writes the result back into the PCR 278. In embodiments where the first (initializing) write to PCR 278 is limited to the SENTER instruction, the resulting digest may be used as a root of trust for the system.

Once the trusted SINIT code has completed its execution, and has registered the identity of the SVMM in a PCR, the SINIT code may transfer ILP execution control to the SVMM. In a typical embodiment, the first SVMM instructions executed by the ILP may represent a self-initialization routine for the SVMM. The ILP may in one embodiment issue individual RLP JOIN MESSAGE special bus messages to each RLP, causing each of the RLPs to join in operations under the supervision of the now-executing copy of SVMM. From this point onwards, the overall system is operating in trusted mode.

Currently, the transfer of control from platform OEM code into third party code, such as an operating system loader, has a window of vulnerability. Specifically, even if the UEFI Portable Executables are digitally signed, malware that is using a leaked key can still attempt to gain control. TXT and the Launch-Control Policy (LCP) can white list the Measured Launch Environment (MLE) that attempts to enable virtualization controls and enter secure mode via VMX and SMX instructions, respectively.

The UEFI firmware that invokes the UEFI executable via the SENTER leaf instruction may be used, for example, if the malware doesn't invoke SMX. By atomically associating OEM-to-third-party invocation with the SENTER or similar instruction, along with the UEFI StartImage service, secure transfer of control of the OEM firmware into the OS loader may be accomplished, where the latter is a UEFI executable image.

Figure 3:
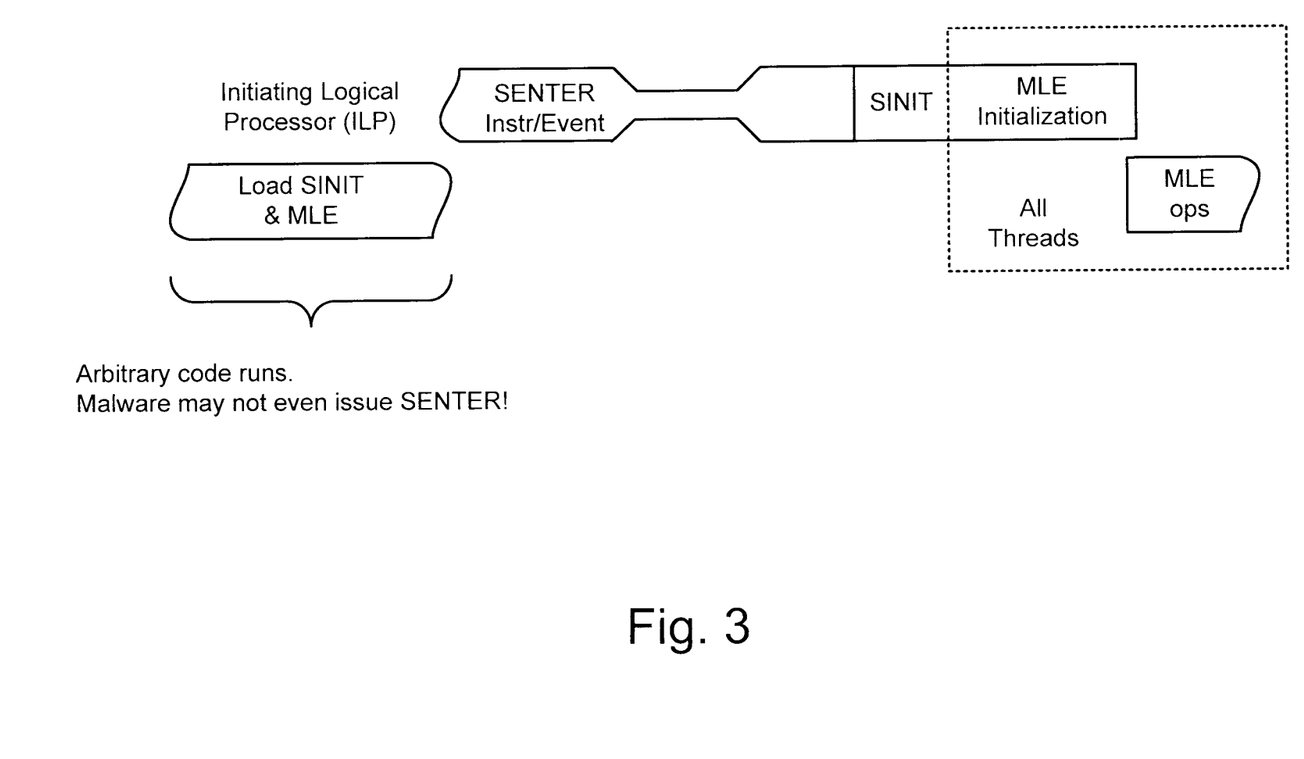
FIG. 3 is a conceptual illustration of Time-of-Check-Time-of-Use (TOCTOU) vulnerability.

By having UEFI firmware do an image verification and then the OS loader, or kernel, do the SENTER later, there is the possibility of a Time-of-Check-Time-of-Use (TOCTOU) vulnerability. The Time-of-Check is the image invocation from firmware (including but not limited to checking its digital signature) and the time-of-use is the image somewhere in an instruction after its entry point or a later loaded executable invoking SENTER. FIG. 3 is a conceptual illustration of TOCTOU vulnerability.

Figure 4:
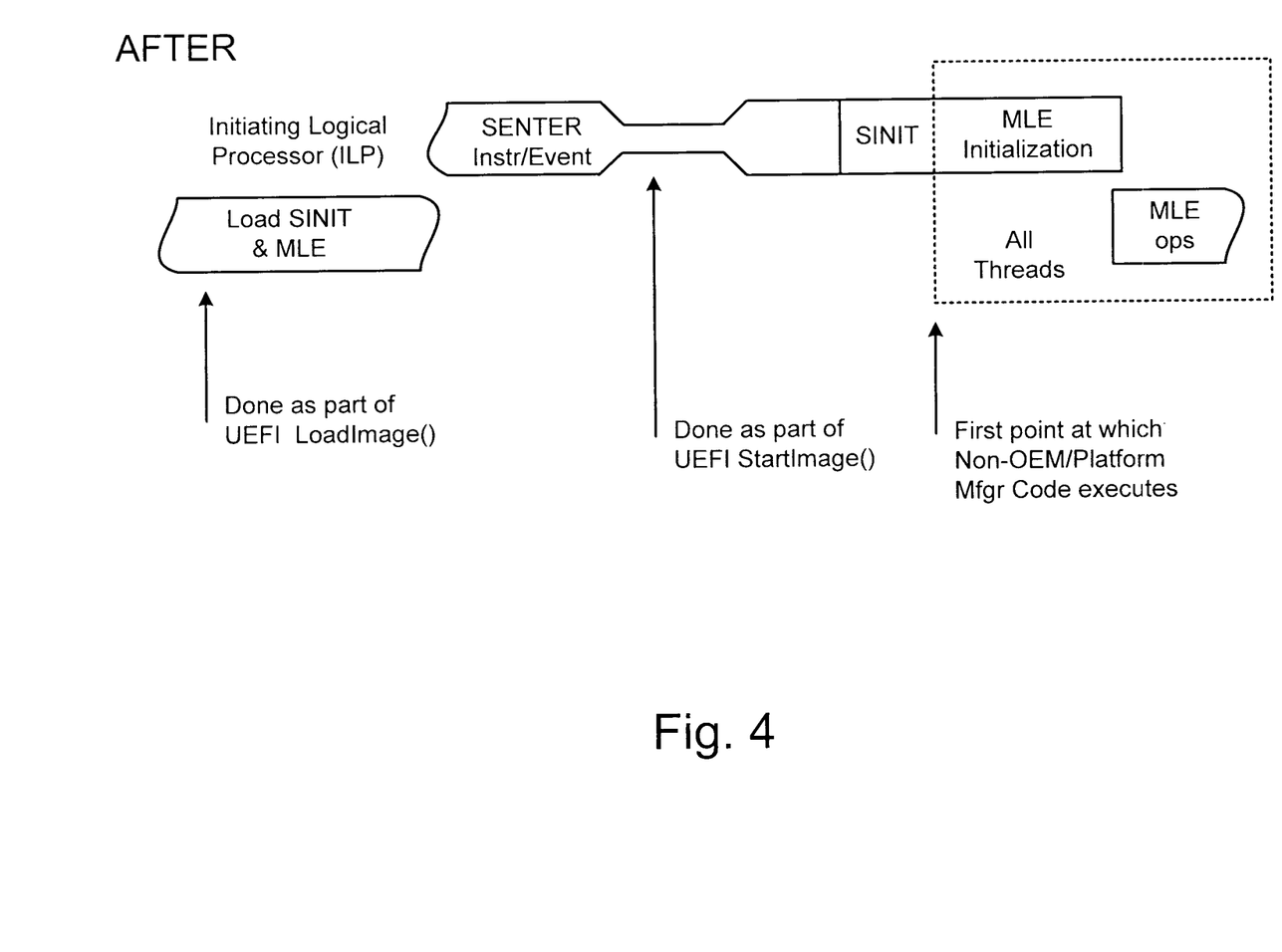
FIG. 4 is a conceptual illustration of a technique without the TOCTOU vulnerability.

FIG. 4 is a conceptual illustration of a secure technique described herein. In one embodiment, use of TXT-Enhanced LoadImage( )/StartImage( ) is applicable for both local and remotely invoked images. It may be more important for the remote boot, or Pre-Boot Execution (PXE), scenario, because of the possibility of man-in-the-middle (MITM) and plurality of other network-borne malware/threats. More information on UEFI images and PXE can be found in the UEFI2.1 specification, January 2007. With ever widening network perimeters, one can envision a MITM being a rogue DHCP server or other machine that intercepts the UEFI image in flight and corrupts its contents prior to deliver the UEFI client for execution.

Figure 5:
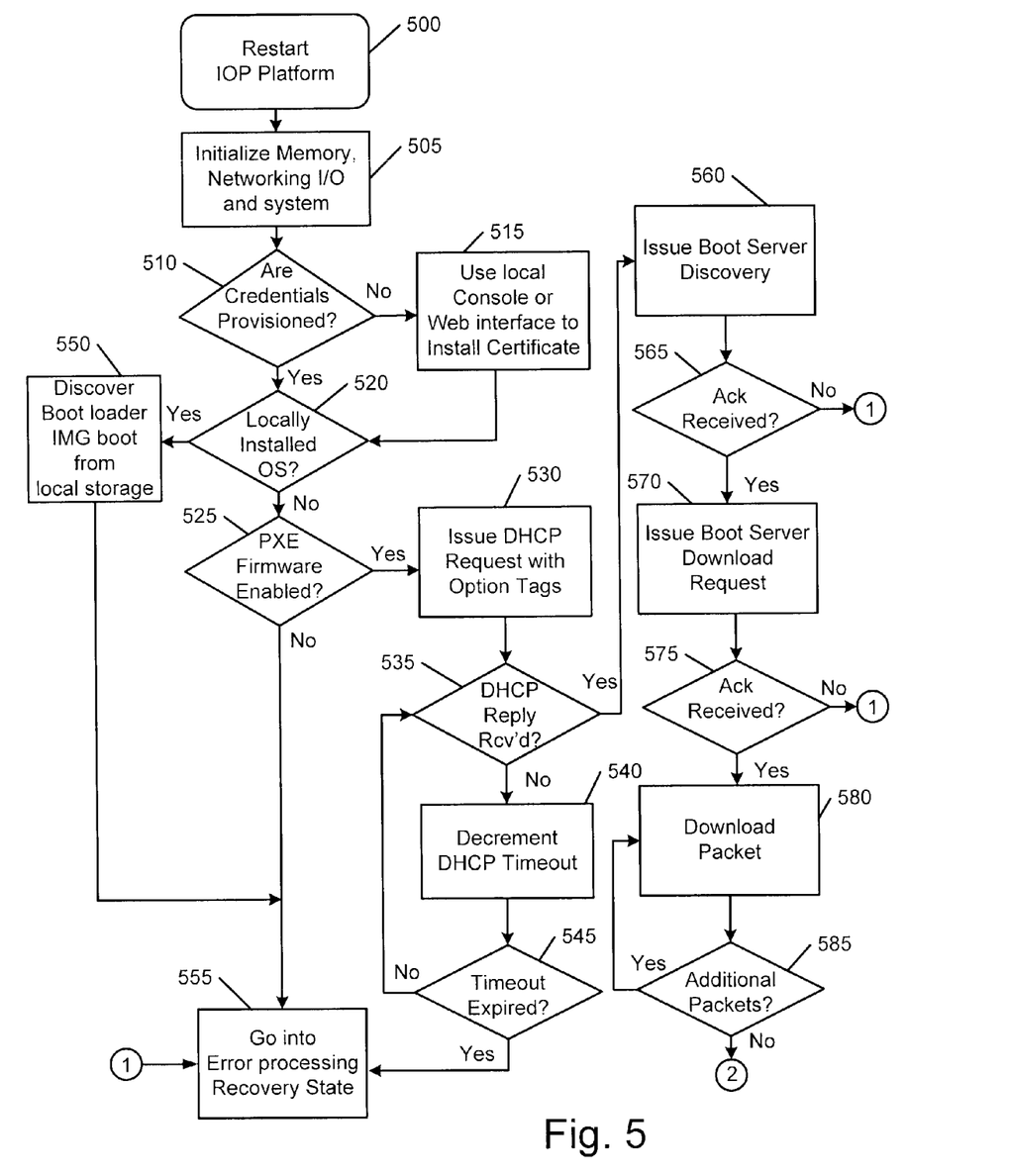
FIG. 5 is a flow diagram of one embodiment of a network boot process.
Figure 6:
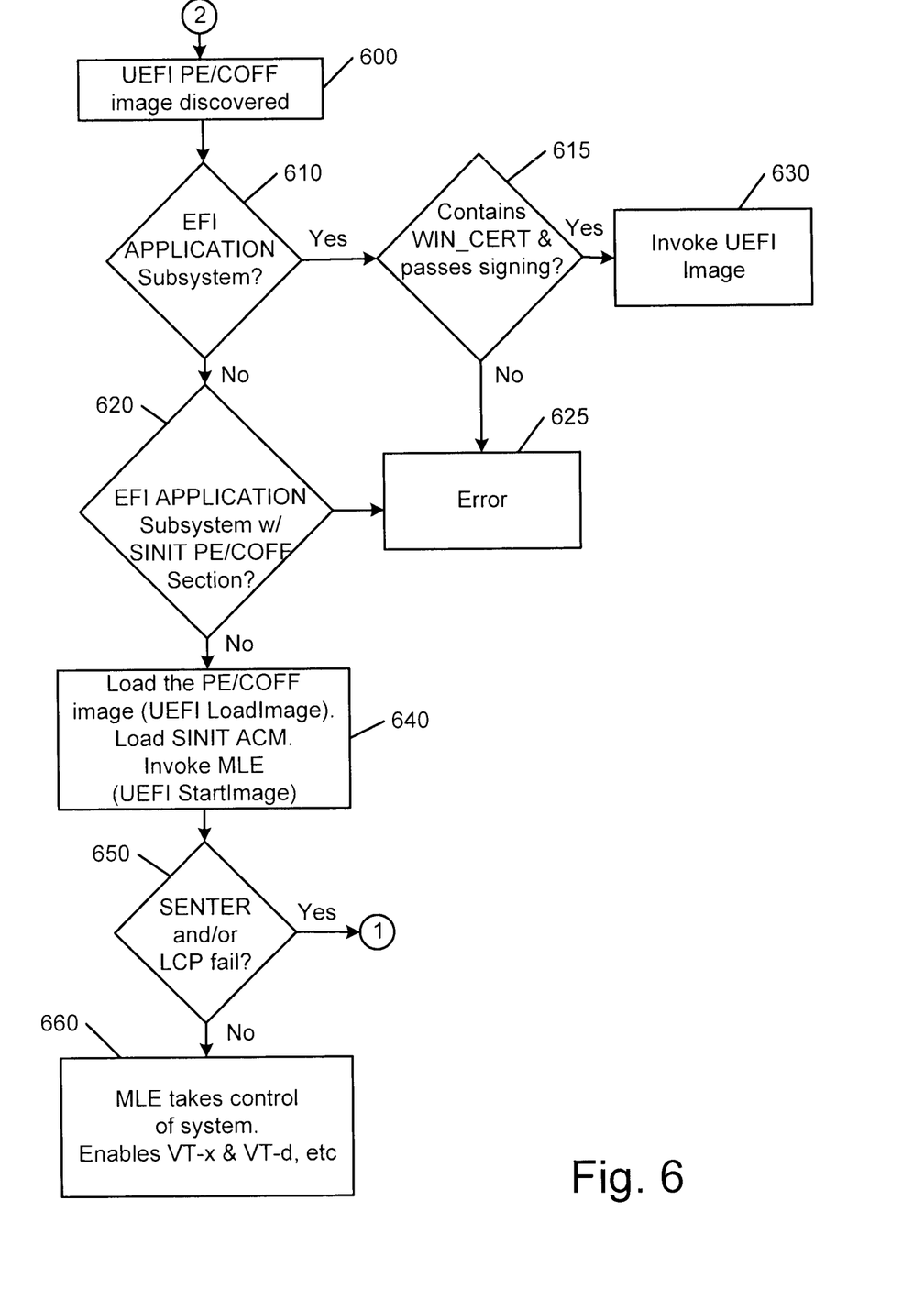
FIG. 6 is a flow diagram of one embodiment of support for image invocation in a pre-boot environment.

FIG. 5 is a flow diagram of one embodiment of a network boot process. When sufficient packets are collected to form a complete UEFI image, the assignment of the image integrity occurs. FIG. 6 describes preserving UEFI capability, but if the UEFI OS loader has an SINIT Authenticated Code Module (ACM) as a PE/COFF section, then the UEFI firmware may invoke SENTER SMX leaf instruction as the means of passing control to the image.

Another embodiment may include a new UEFI image type called EFI_IMAGE_SUBSYSTEM_EFI_TRUSTED_APPLICATION to complement the below-list of EFI image types found in the PE/COFF Specification:

define EFI_IMAGE_SUBSYSTEM_EFI_APPLICATION
define EFI_IMAGE_SUBSYSTEM_EFI_BOOT_SERVICE_DRIVER
define EFI_IMAGE_SUBSYSTEM_EFI_RUNTIME_DRIVER When UEFI firmware detects this new image type, it may conjoin invocation of the SENTER instruction with the StartImage process, for example.

Turning to FIG. 5, when the platform is started, 500, memory, networking, as well as other system components are initialized, 505. The system determines whether credentials are provisioned, 510. If the credentials are not provisioned, a local console or Web interface may be used to install the certificate, 515. If the credentials are not provisioned, the system determines whether there is a locally installed operating system, 520.

If there is a locally installed operating system, the boot image is located on a local storage device, 550. After the boot image is located, processing continues as described in FIG. 6. If there is no locally installed operating system, the system determines whether PXE firmware is enabled, 525.

If the PXE firmware is not enabled, an error processing/recovery state is entered, 555. In one embodiment, if the PXE firmware is enabled, a DHCP request is issued with option tags, 530. In other embodiments, other network configuration requests may be utilized. If the DHCP reply is not received,

535, a DHCP timeout counter may be decremented, 540. If the timeout expires, 545, the error processing/recovery state may be entered, 555.

When the DHCP reply is received, 535, the system may issue a boot server discovery, 560. If an acknowledgement is not received, 565, the error processing/recovery state may be entered, 555. When the acknowledgement is received, 656, the system may issue a boot server download request, 570. If an acknowledgement is not received, 575, the error processing/recovery state may be entered, 555.

When the acknowledgement is received, 575, the packet may be downloaded, 580. If additional packets are required, 585, those additional packets may be downloaded, 580. If no additional packets are required, 585, processing may continue according to the flow of FIG. 6.

UEFI employing SENTER/LCP may provide a strong inoculation against introduction of Blue-Pill hyper-viruses into the platform. A Blue Pill is essentially a virus that uses hardware virtualization techniques to "hide" itself from the main operating system or another virtual machine/hypervisor. It is more pernicious than typical malware because virtualization hardware can been designed to be undetectable (i.e., no "virtualization holes"), such that admission of said malware to the machine may be very difficult or even impossible to eradicate.

FIG. 6 is a flow diagram of one embodiment of support for image invocation in a pre-boot environment. In one embodiment, the downloaded image is a Portable Executable (PE) format or a PE/COFF format. In alternate embodiments, other formats may be utilized. In response to the image being discovered, 600, the system may determine whether the there is an EFI subsystem. If so, and the image passes any appropriate signing tests, 615, the UEFI image may be invoked, 630. If the image does not pass the appropriate signing tests, 615, an error may occur, 625.

If the EFI subsystem is available and includes a SINIT PE/COFF section, 620, the image may be loaded, 640. The EFI subsystem may invoke the SENTER instruction to cause the computing system to enter a known, secure state. If the SENTER fails, 650, that MLE may take control of the system, 660.

Figure 7:
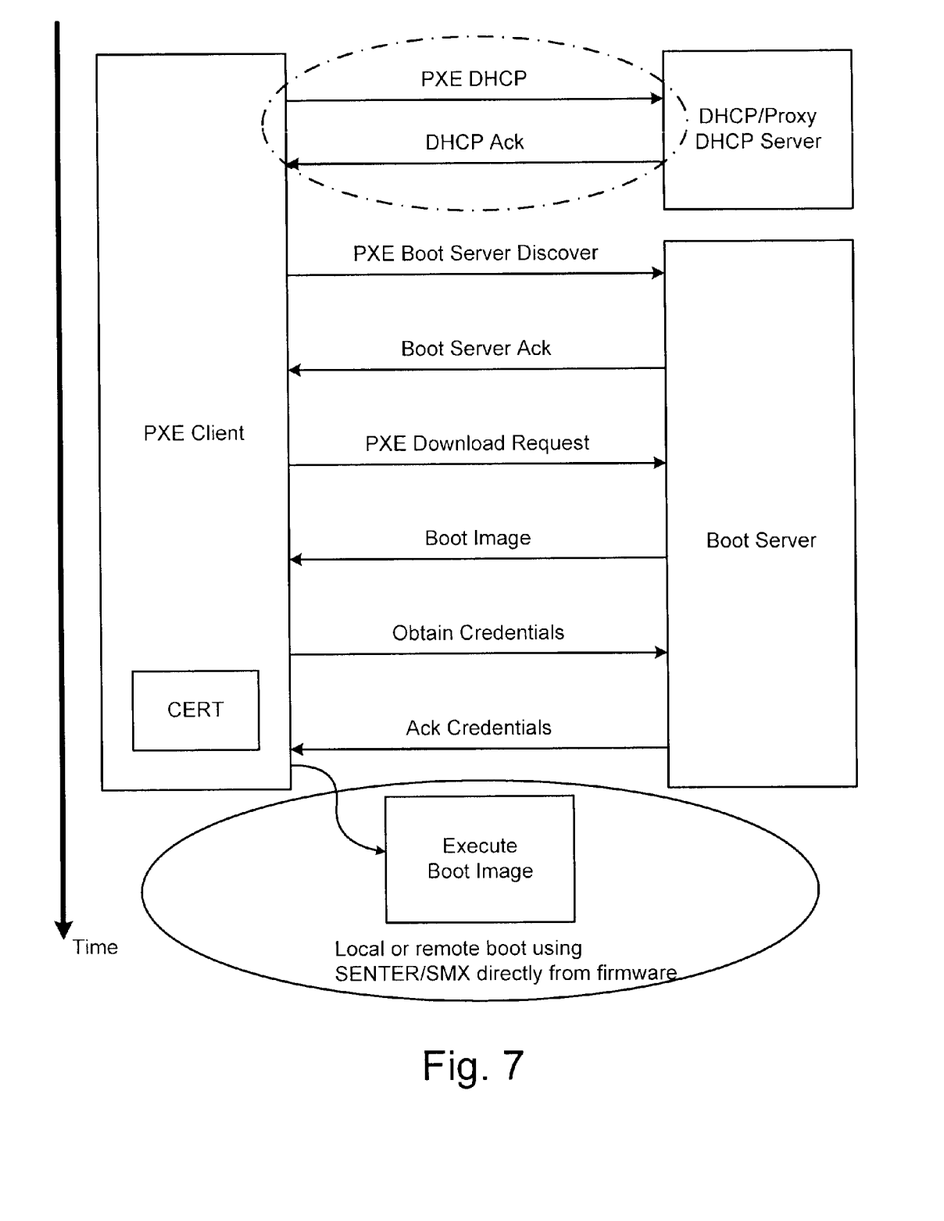
FIG. 7 is one embodiment of a remote boot process.

FIG. 7 is one embodiment of a remote boot process. The process of FIG. 7 describes a PXE client interacting with a remote boot server; however, in other embodiments, other client devices/components may be used.

The PXE client may interact with a remote DHCP server in order to initialize network communications. DHCP operations are known in the art. Any alternative comparable operations may also be used.

The PXE client may interact with a remote boot server to obtain one or more boot images to be used to boot the host electronic device. One embodiment of a remote boot device is described above. In one embodiment, the PXE client utilizes a certificate (CERT) for security purposes. The PXE client may execute the downloaded boot image using the SENTER instruction discussed above directly from firmware to provide a secure transition between the firmware and the boot image.

Currently, UEFI passes control to executables in ring0; hypervisors and virtual machines typically invoke TXT later in the boot process, including but not limited to even during the operational OS environment. The techniques described herein enhance the UEFI hand-off and close windows of hypervisor vulnerability by invoking the UEFI image (e.g., OS loader) using TXT SENTER. This is an atomic transfer of control securely from pre-OS OEM code to OS runtime operating system vendor (OSV) code.

Figure 8:
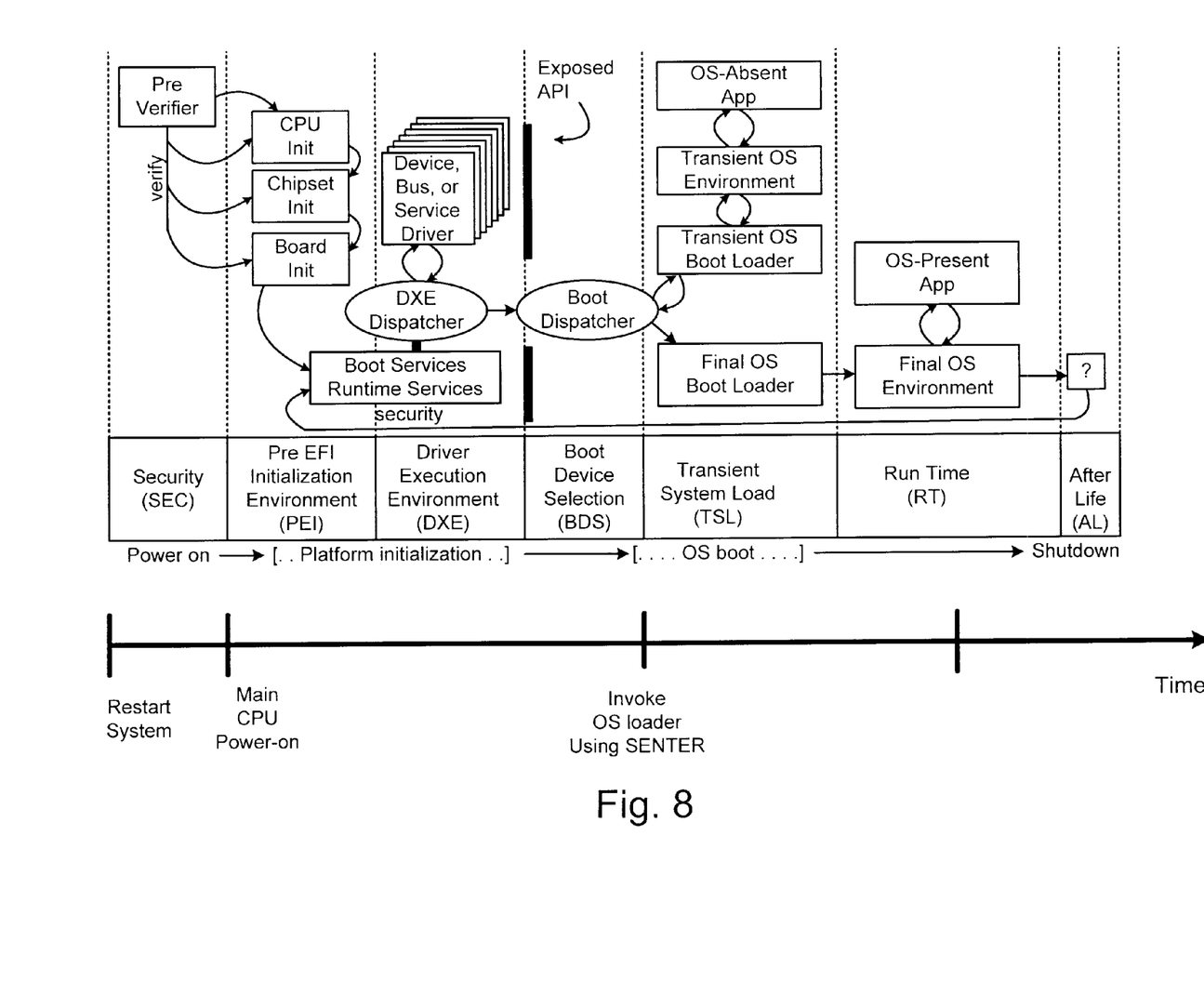
FIG. 8 is a timeline diagram of one embodiment of a secure boot operation.

FIG. 8 is a timeline diagram of one embodiment of a secure boot operation. Conceptually, the operation of a computing device can be considered to involve the phases illustrated in FIG. 8 (Security, Pre-EFI Initialization, Driver Execution, Boot Device Selection, Transient System Load, Run Time, After Life). In one embodiment, in response to a system power on or reset, a Security (SEC), pre-verification operations may be performed. In one embodiment, during SEC, power may be provided to some system components, but possibly not all system components (e.g., no power to the processor(s)).

Then, the processor(s) may be powered on and the Pre-EFI Initialization Environment (PEI) may be entered in which verification of various components (e.g., Processor, Chipset, Motherboard) may be performed. Boot Services and Runtime Services may be initiated during PEI. After PEI, the Driver Execution Environment (DXE) may be entered. In DXE, device drivers, bus drivers and/or service drivers may be dispatched.

In one embodiment, the DXE Dispatcher may launch the Boot Dispatcher for operation in Boot Device Selection (DBS), which may be subsequent to DXE. In one embodiment, the Boot Dispatcher is executed from system firmware and my use the SENTER instruction to initiate Transient OS Boot Loader and/or Final OS Boot Loader during Transient System Load (TSL). In one embodiment, during TSL, The Transient OS Boot Loader may initiate the Transient OS Environment, which in turn may initiate OS-Absent Application(s).

The Final OS Boot Loader may initiate the Final OS Environment for operation during Run Time (RT). The Final OS Environment may be used to initialize OS-Present Application(s). RT may be used until the system is shutdown (After Life, or AL).

Figure 9:
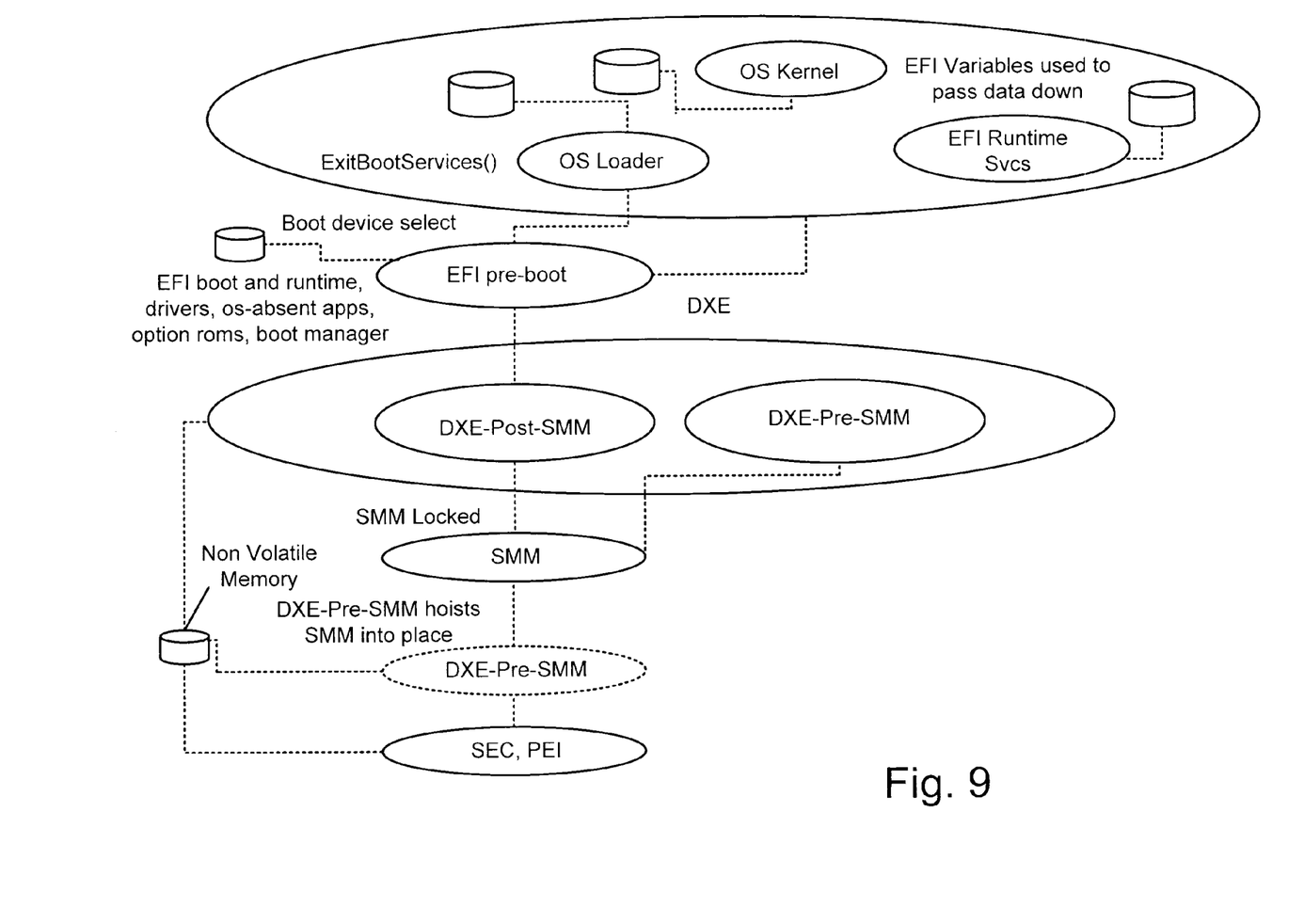
FIG. 9 is a conceptual diagram of a secure boot operation that may be used to authorize third party drivers (e.g., device drivers) prior to operating system invocation.

FIG. 9 is a conceptual diagram of a secure boot operation that may be used to authorize third party drivers (e.g., device drivers) prior to operating system invocation. In FIG. 9, the circles indicate the SEC, PEI, and DXE-SMM. In one embodiment, these code flows are under control of the platform manufacturer and are not third party-extensible. In alternate embodiments, these may be third party extensible.

In one embodiment, these flows have read-only flash protection, the ability to lock and secure System Management RAM (SMRAM) through chipset controls. It is prior to entering the "EFI Pre-boot" where third party executables are admitted into the machine for invocation, namely UEFI images. At this point the UEFI LoadImage/StartImage process will make this admission control decision, for example, including TXT SENTER, or equivalent. As such, the OEM SEC/PEI/DXE can directly pass control to the OS loader UEFI executable.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
executing pre-boot instructions stored in a system component having non-volatile memory configured to execute the pre-boot instructions independent of a host system processor;
invoking, with the system component having non-volatile memory an instruction to cause a host computing platform to enter a known, secure state;
copying one or more software components from a storage device to a system memory prior to launching an operating system, wherein the one or more components include a secure virtual machine monitor (SVMM);
configuring a device-access page table and a device-access logic to protect memory pages used by the memory-resident SVMM from interference by non-processor devices to create a secure virtual machine environment, wherein the secure virtual machine environment hosts the SVMM to operate as a privileged code to permit or deny direct access to one or more system resources by the operating system or one or more software applications within the created secure virtual machine environment;
calculating an identity of the SVMM, and registering the identity into a register, wherein registering includes placing a trust measurement of the SVMM into a register such that trustworthiness of the SVMM is made available for inspection by a potential system user;
launching the operating system with the system component from the known, secure state; and
causing the host computing platform to execute the operating system in a run time state.

2. The method of claim 1 wherein the pre-boot instructions comprise basic input/output system (BIOS) instructions, and wherein the system component having non-volatile memory comprises a computing platform firmware, register includes platform configuration register (PCR), wherein the computing platform firmware conforms to a Unified Extensible Firmware Interface compliant standard.

3. The method of claim 1 wherein the instruction comprises a secured enter (SENTER) instruction executed by an initiating logical processor (ILP), wherein the SENTER instruction is executed to cause the ILP to issue special bus messages on a system bus and the wait one or more time intervals to issue subsequent system actions, wherein the special bus messages include a SENTER BUS MESSAGE that is responded by an internal non-maskable event issued by a responding logical processor (RLP),
wherein the SENTER instruction initiates a transient operating system boot loader or a final operating system boot loader during a transient system load (TSL), wherein during the TSL, the transient OS boot loader initiates a transient operating system environment which in turn initiates one or more operating system-absent applications.

4. The method of claim 1 wherein the instruction comprises a secured initialization (SINIT) instruction as initiated by SINIT code, wherein copying further includes copying a SINIT-authentication code (SINIT-AC) module from the storage device to the system memory prior to launching an operating system.

5. The method of claim 1 further comprising:
receiving the pre-boot instructions from a remote computing platform via a network connection; and
executing the pre-boot instructions by a host system firmware component independent of the host system processor.

6. At least one non-transitory machine-readable medium having stored thereon instructions which, when executed, cause a machine to perform one or more operations comprising:
executing pre-boot instructions stored in a system component having non-volatile memory configured to execute the pre-boot instructions independent of a host system processor;
invoking, with the system component having non-volatile memory an instruction to cause a host computing platform to enter a known, secure state;
copying one or more software components from a storage device to a system memory prior to launching an operating system, wherein the one or more components include a secure virtual machine monitor (SVMM);
configuring a device-access page table and a device-access logic to protect memory pages used by the memory-resident SVMM from interference by non-processor devices to create a secure virtual machine environment, wherein the secure virtual machine environment hosts the SVMM to operate as a privileged code to permit or deny direct access to one or more system resources by the operating system or one or more software applications within the created secure virtual machine environment;
calculating an identity of the SVMM, and registering the identity into a register, wherein registering includes placing a trust measurement of the SVMM into a register such that trustworthiness of the SVMM is made available for inspection by a potential system user;
launching the operating system with the system component from the known, secure state; and
causing the host computing platform to execute the operating system in a run time state.

7. The non-transitory machine-readable medium of claim 6 wherein the pre-boot instructions comprise basic input/output system (BIOS) instructions, wherein the system component having non-volatile memory comprises a computing platform firmware, register includes platform configuration register (PCR), wherein the computing platform firmware conforms to a Unified Extensible Firmware Interface compliant standard.

8. The non-transitory machine-readable medium of claim 6 wherein the instruction comprises a secured enter (SENTER) instruction executed by an initiating logical processor (ILP), wherein the SENTER instruction is executed to cause the ILP to issue special bus messages on a system bus and the wait one or more time intervals to issue subsequent system actions, wherein the special bus messages include a SENTER BUS MESSAGE that is responded by an internal non-maskable event issued by a responding logical processor (RLP),
wherein the SENTER instruction initiates a transient operating system boot loader or a final operating system boot loader during a transient system load (TSL), wherein during the TSL, the transient OS boot loader initiates a transient operating system environment which in turn initiates one or more operating system-absent applications.

9. The non-transitory machine-readable medium of claim 6 wherein the instruction comprises a secured initialization (SINIT) instruction as initiated by SINIT code, wherein copying further includes copying a SINIT-authentication code (SINIT-AC) module from the storage device to the system memory prior to launching an operating system.

10. The non-transitory machine-readable medium of claim 6 wherein the one or more operations further comprise:

receiving the pre-boot instructions from a remote computing platform via a network connection; and executing the pre-boot instructions by a host system firmware component independent of the host system processor.

11. An apparatus comprising a computing device hosting a mechanism, the mechanism to:

execute pre-boot instructions stored in a system component having non-volatile memory configured to execute the pre-boot instructions independent of a host system processor;

invoke, with the system component having non-volatile memory an instruction to cause a host computing platform to enter a known, secure state;

copy one or more software components from a storage device to a system memory prior to launching an operating system, wherein the one or more components include a secure virtual machine monitor (SVMM);

configure a device-access page table and a device-access logic to protect memory pages used by the memory-resident SVMM from interference by non-processor devices to create a secure virtual machine environment, wherein the secure virtual machine environment hosts the SVMM to operate as a privileged code to permit or deny direct access to one or more system resources by the operating system or one or more software applications within the created secure virtual machine environment;

calculate an identity of the SVMM, and registering the identity into a register, wherein registering includes placing a trust measurement of the SVMM into a register such that trustworthiness of the SVMM is made available for inspection by a potential system user;

launch the operating system with the system component from the known, secure state; and cause the host computing platform to execute the operating system in a run time state.

12. The apparatus of claim 11 wherein the pre-boot instructions comprise basic input/output system (BIOS) instructions, wherein the system component having non-volatile memory comprises a computing platform firmware, register includes platform configuration register (PCR), wherein the computing platform firmware conforms to a Unified Extensible Firmware Interface compliant standard.

13. The apparatus of claim 11 wherein the instruction comprises a secured enter (SENTER) instruction executed by an initiating logical processor (ILP), wherein the SENTER instruction is executed to cause the ILP to issue special bus messages on a system bus and the wait one or more time intervals to issue subsequent system actions, wherein the special bus messages include a SENTER BUS MESSAGE that is responded by an internal non-maskable event issued by a responding logical processor (RLP), wherein the SENTER instruction initiates a transient operating system boot loader or a final operating system boot loader during a transient system load (TSL), wherein during the TSL, the transient OS boot loader initiates a transient operating system environment which in turn initiates one or more operating system-absent applications.

14. The apparatus of claim 11 wherein the instruction comprises a secured initialization (SINIT) instruction as initiated by SINIT code, wherein copying further includes copying a SINIT-authentication code (SINIT-AC) module from the storage device to the system memory prior to launching an operating system.

15. The apparatus of claim 11 wherein the mechanism is further to:

receive the pre-boot instructions from a remote computing platform via a network connection; and facilitate a host system firmware component to executing the pre-boot instructions independent of the host system processor, wherein the host system firmware component conforms to a Unified Extensible Firmware Interface-compliant standard.

16. A system comprising a processor and a storage medium having thereon instructions, wherein the processor executes the instructions to perform one or more operations comprising:

executing pre-boot instructions stored in a system component having non-volatile memory configured to execute the pre-boot instructions independent of a host system processor;

invoking, with the system component having non-volatile memory an instruction to cause a host computing platform to enter a known, secure state;

copying one or more software components from a storage device to a system memory prior to launching an operating system, wherein the one or more components include a secure virtual machine monitor (SVMM);

configuring a device-access page table and a device-access logic to protect memory pages used by the memory-resident SVMM from interference by non-processor devices to create a secure virtual machine environment, wherein the secure virtual machine environment hosts the SVMM to operate as a privileged code to permit or deny direct access to one or more system resources by the operating system or one or more software applications within the created secure virtual machine environment;

calculating an identity of the SVMM, and registering the identity into a register, wherein registering includes placing a trust measurement of the SVMM into a register such that trustworthiness of the SVMM is made available for inspection by a potential system user;

launching the operating system with the system component from the known, secure state; and causing the host computing platform to execute the operating system in a run time state.

17. The system of claim 16 wherein the pre-boot instructions comprise basic input/output system (BIOS) instructions, wherein the system component having non-volatile memory comprises a computing platform firmware, register includes platform configuration register (PCR), wherein the computing platform firmware conforms to a Unified Extensible Firmware Interface compliant standard.

18. The system of claim 16 wherein the instruction comprises a secured enter (SENTER) instruction executed by an initiating logical processor (ILP), wherein the SENTER instruction is executed to cause the ILP to issue special bus messages on a system bus and the wait one or more time intervals to issue subsequent system actions, wherein the special bus messages include a SENTER BUS MESSAGE that is responded by an internal non-maskable event issued by a responding logical processor (RLP), wherein the SENTER instruction initiates a transient operating system boot loader or a final operating system boot loader during a transient system load (TSL), wherein during the TSL, the transient OS boot loader initiates a transient operating system environment which in turn initiates one or more operating system-absent applications.

19. The system of claim 16 wherein the instruction comprises a secured initialization (SINIT) instruction as initiated by SINIT code, wherein copying further includes copying a SINIT-authentication code (SINIT-AC) module from the storage device to the system memory prior to launching an operating system.

20. The system of claim 16 wherein the one or more operations further comprise:
 receiving the pre-boot instructions from a remote computing platform via a network connection; and
 executing the pre-boot instructions by a host system firmware component independent of the host system processor.

\* \* \* \* \*